Jan. 29, 1924.

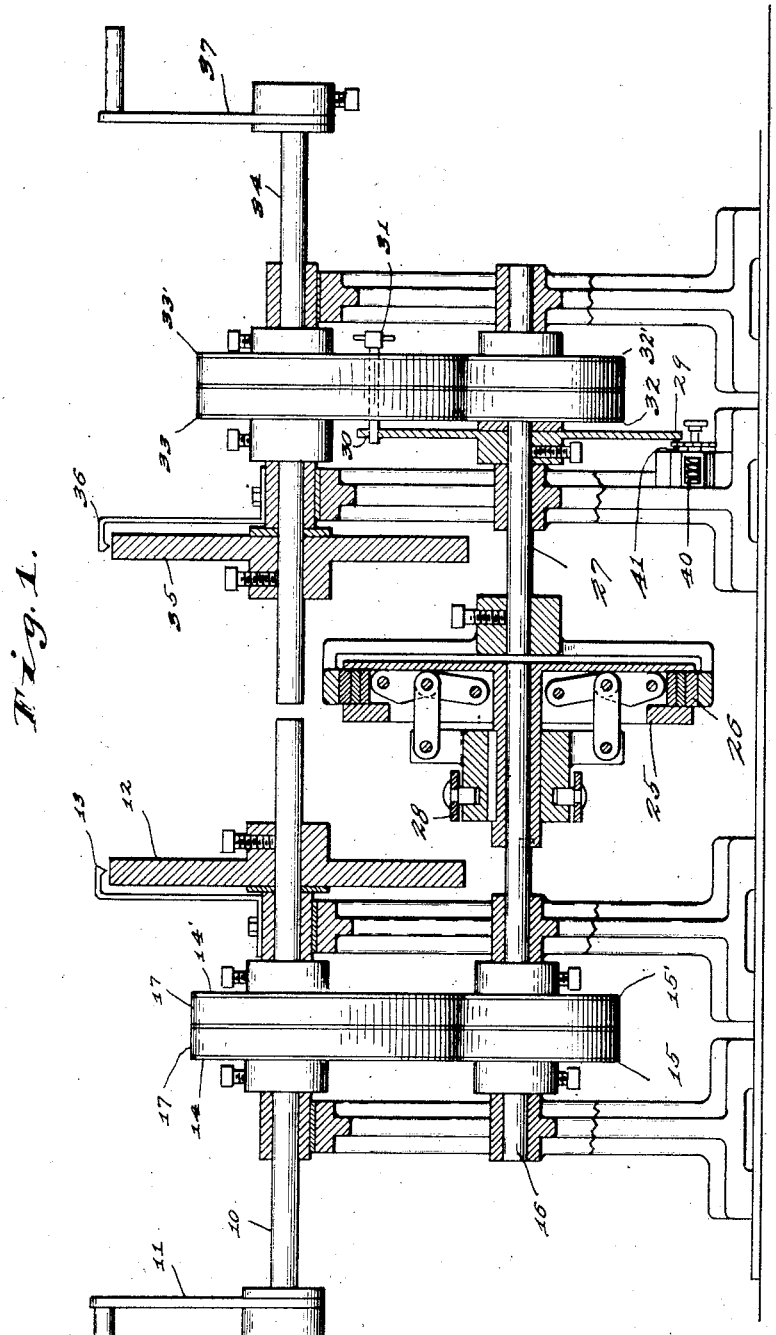

T. W. ROSS

CALCULATING MACHINE

Filed Nov. 9, 1918

1,482,152

2 Sheets-Sheet 2

Inventor
Taylor W. Ross,
By Hood & Schley, Attorneys

Patented Jan. 29, 1924.

1,482,152

UNITED STATES PATENT OFFICE.

TAYLOR W. ROSS, OF NEWPORT NEWS, VIRGINIA.

CALCULATING MACHINE.

Application filed November 9, 1918. Serial No. 261,765.

*To all whom it may concern:*

Be it known that I, TAYLOR W. ROSS, a citizen of the United States, residing at Newport News, in the county of Warwick and State of Virginia, have invented a new and useful Calculating Machine, of which the following is a specification.

Commercial calculating machines now commonly in use are of the addition type; so that processes of multiplication can only be carried out by successive addition processes, and processes of division can only be carried out by subtraction processes. As a consequence, such machines are of little practical value for the purpose of multiplication and division, because they require a very large amount of mental operation.

The object of my present invention is to produce a mechanism by means of which successive processes of multiplication or division may be carried out in any desired order without the exercise of a high degree of skill and without the need of the exercise of mental processes other than those required in the mere setting of indicating elements to indicate the desired multipliers or divisors.

Figure 3:
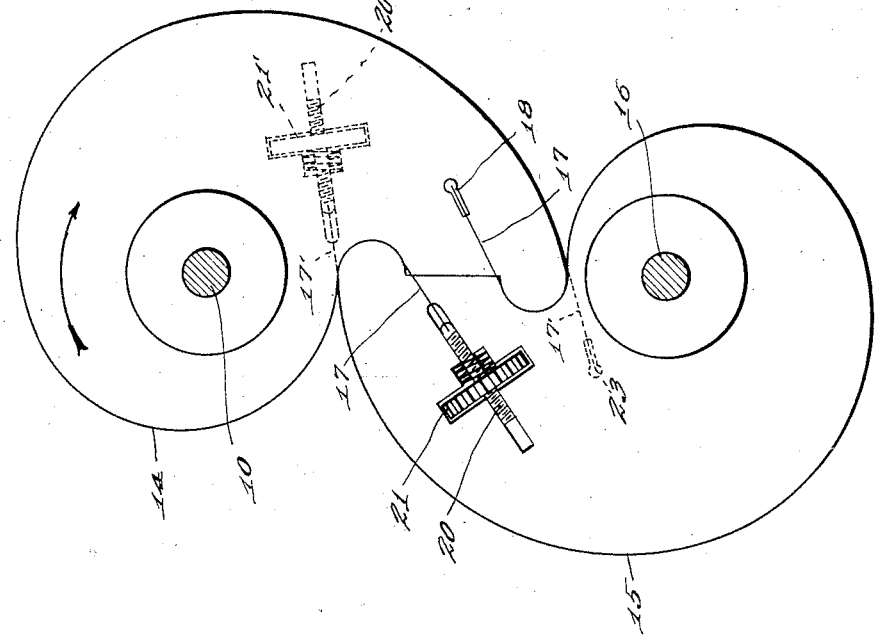
Figure 2:
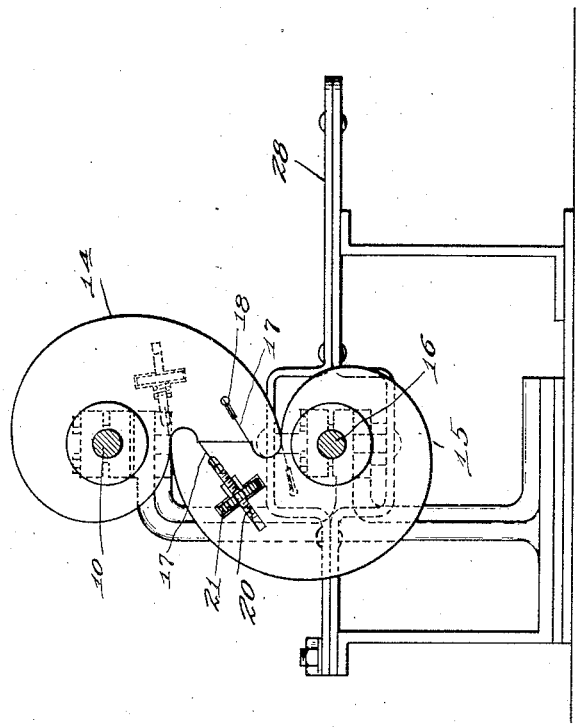

The accompanying drawings illustrate my invention. Fig. 1 is an axial section; Fig. 2 a side elevation; Fig. 3 a detail of one pair of logarithmic elements.

In the drawings, 10 indicates the main shaft, provided with an operating lever 11. Carried by shaft 10 is an indicator disk 12, the circumference of which is divided into nine equal main divisions which, in turn, are subdivided into ten equal subdivisions and these subdivisions again each subdivided into ten equal divisions, and so on to as fine a degree of subdivision as may be practical, depending upon the diameter of the disk.

A pointer 13 is provided adjacent the circumference of disk 12. Secured to shaft 10 is an element 14, the periphery of which is determined by a variable radius which is a logarithmic function of the variable number "$y$," from 1 to 10 measuring the angular distance of the radius from the initial radius of element 14. This element 14 may be conveniently referred to as the numerical element. Mating with the numerical element 14 is an element 15, the periphery of which is determined by a variable radius, (angularly spaced from the initial radius by an angle which is measured by the logarithm of the number represented by the corresponding and complementary radius of the numerical element 14), which added to the corresponding and complementary radius of element 14, is a constant equal to the distance between the axes of shaft 10 and shaft 16 which carries element 15. This element may be conveniently referred to as the logarithmic element. Any suitable means, such as gear teeth, straps, etc., may be provided to form a connection between the numerical and logarithmic elements 14 and 15, so that rotation of one will produce corresponding rotation of the other.

In the present drawing, I have illustrated a tension tape connection 17, between the elements 14 and 15, this tape 17 being anchored at 18 to element 14 near the longest radius of said element and passed thence around the tip thereof and from there wrapped around the periphery of element 15 and around the tip of the longest radius of element 15 and attached to an adjusting screw 20 which passes through an adjusting nut 21 mounted in element 15 and backed by a spring 22 which will maintain a tension in tape 17.

In order that reverse rotation of shaft 10 may act upon shaft 16 by a pull upon a tension tape, instead of a push upon tape 17, I provide the companion numerical elements 14' and 15', corresponding to elements 14 and 15, and these are connected by a tape 17', one end of which is anchored at 23 to element 15' and passed from thence around the periphery of element 14' and anchored, by means of adjusting screw 20' and nut 21', adjacent the smallest radius of element 14'.

Shaft 16 lies parallel with shaft 10 and carries a friction clutch member 25 which cooperates with the friction clutch member 26 carried by shaft 27 alined with shaft 16, the clutch member 25 being provided with an operating lever 28, by means of which it may be thrown into and out of engagement with member 26.

Secured to shaft 27 is a disk 29 provided at one point with hole 30 which is adapted to receive a pin 31 carried by logarithmic elements 32, 32', which correspond to the elements 15, 15', said elements 32, 32' being journaled freely upon shaft 27. The elements 32 and 32' are connected by tapes (like the tapes 17 and 17' already described) with numerical elements 33 and 33', respectively, corresponding to the elements 14 and 14', and secured to a shaft 34. Shaft 34 is arranged in alinement with shaft 10 and carries an indicator disk 35, which is a duplicate of disk 12. A pointer 36 is arranged adjacent disk 35 and shaft 34 is provided with a suitable operating arm 37.

The operation is as follows: The normal position of the parts are with the shaft 10 turned as far as possible in a counterclockwise direction (Fig. 2) at which time the long-radius faces of the two elements 14, 15 and 14', 15', are in engagement with each other. Similarly the elements 32, 33 and 32', 33' are in contact with each other and pin 31 is withdrawn from hole 30 of disk 29. The initial or unity position of disk 12 lies opposite pointer 13 and the initial or unity position of disk 35 lies opposite pointer 36. The operator, in order to obtain the result of multiplying action, turns shaft 10 in a clockwise direction until that portion of disk 12, corresponding in its indication to the multiplicand, comes opposite pointer 13, this operation turning shaft 16 through an angular distance, measured on the circumference of a circle, equal to the logarithm of the multiplicand (where the whole circumference equals the logarithm of ten, which is unity and thus carrying shaft 27 and disk 29 through the same angular distance. Thereupon, lever 28 will be thrown so as to disconnect clutch member 25 from clutch member 26 and shaft 10 will then be returned to initial position. Clutch 25 will be returned to clutching position and shaft 10 will then be again moved in a clockwise direction until disk 12 is brought to a position opposite pointer 13 to indicate the multiplier, this movement further advancing the disk 29 through an angular distance corresponding to the logarithm of the multiplier and thereby adding the logarithms of multiplicand and multiplier together. This operation will be repeated as many times as there are multipliers to be used, the operator either keeping track of the number of complete rotations of disk 29 or noting the final reading of a counter 40 which will be advanced step by step by means of a pin 41 carried by disk 29 as disk 29 passes through a complete revolution in anti-clockwise direction viewed from left-hand side.

If a division is desired at any time during the process, the operator will, after returning shaft 10 to initial position, leave clutch member 25 out of engagement with clutch member 26 while shaft 10 is being turned in a clockwise direction to bring disk 12 into position to indicate the divisor. Thereupon, clutch member 25 will be thrown into engagement with clutch member 26 and shaft 10 turned in a counterclockwise direction to the initial position, this operation serving to carry disk 29 backward through an angular distance corresponding to the logarithm of the divisor and thus subtracting this logarithm from the logarithms which have previously been totalized into the position of the disk 29. In division disk 29 moves backward, i. e., in opposite direction from that when multiplying, and if it moves back through the initial position, counter 40 will move backward one step for each time disk 29 passes back through the initial point.

When as many operations of multiplication and division have been entered into the machine, in the manner described, as may be desired, the operator will turn shaft 34 from its initial position until pin 31 may be entered into hole 30, whereupon the reading of disk 35 opposite the pointer 36 will be the final result of the various multiplying and dividing operations which have been indicated by the machine. The decimal point in the final result will be determined by the reading of counter 40 or the memory of the operator. In multiplication, counter 40 adds the number of times disk 29 passes through the initial position in its forward movement and in division subtracts the number of times disk 29 passes through the initial position in its backward movement.

Counter 40 of the common "Veeder" type having a star wheel 41, is also arranged so that it can be moved forward or backward independently of the movement of disk 29, in order that it may be made to register the effect, in the answer, of the position of the decimal point in each multiplier and divider, as same is set up on machine. That is, the counter is advanced or moved backward for each multiplier or divider, according to well-known rules which may be stated as follows:—

If the multiplier is 10 or more, and less than 100, the counter 40 is advanced one step, thus advising the operator as to the decimal position of the final result, in the manner well known in connection with the use of logarithms.

If the multiplier is a fraction, the first figure is in the tenths digit, the counter 40 is moved backward one step and an additional step backward for each digit which the first figure may be to the right of the tenths digit.

If the divisor is ten or more and less than one hundred, the counter 40 is moved backward one step and an additional step for each additional higher digit.

If the divisor is a fraction, the first figure of which is in the tenths digit, the counter 40 is advanced one step and an additional step advanced for each digit which the first figure may be to the right of the tenths digit.

When reading counter 40 for the location of the decimal point, it may be found that the counter has advanced or moved backward so many spaces from the initial position which gives the operator the location of the decimal point in the answer by well known rules, as follows:

If the counter is at the initial position, the answer has one digit to the left of the decimal point and an additional digit to the left of the decimal point for each step the counter has moved forward.

If the counter has moved backward, the answer is a fraction whose first figure is in the digit to the right of the decimal point corresponding to the number of steps the counter has moved backward.

It will be understood that the accuracy of the final result will be the same as that of any similar set of operations by use of logarithm and will depend in great measure upon the fineness of the sub-divisions of disks 12 and 35 and this, in turn, will depend to a considerable extent upon the diameters of these elements.

I claim—:

1. A calculating machine comprising a shaft carrying a number-indicating element indicating its angular position, a second shaft, variable-radius connecting elements between the first and the second shafts whereby movement of the first shaft will result in a movement of the second shaft proportionate to a logarithmic function of the movement of the first shaft, a separable connection between the first and second shafts whereby successive movements of the first shaft may be cumulated in the second shaft, a third shaft carrying a number-indicating element, and separable connections between the second and third shafts whereby the cumulated position of the second shaft may be translated into a number position of the third shaft corresponding to the logarithmic position of the second shaft.

2. A calculating machine comprising a shaft carrying a number-indicating element indicating its angular position, a second shaft, variable-radius connecting elements between the first and the second shafts whereby movement of the first shaft will result in a movement of the second shaft proportionate to a logarithmic function of the movement of the first shaft, and a separable connection between the first and second shafts whereby successive movements of the first shaft may be cumulated in the second shaft.

3. A calculating machine comprising a shaft carrying a number indicating element corresponding to varying angular positions of the shaft, a second shaft, a variable-radius element carried by the first shaft and having a periphery having varying radii which are circumferentially spaced in functions of one-ninth of the circumference and have lengths in logarithmic functions corresponding to successive radii, a coacting variable radius element carried with the second shaft and having a periphery having varying radii which are circumferentially spaced in logarithmic functions and lengths equal to a constant minus the length of a corresponding radius of the cooperating element, a third shaft, and a separable connection between the second and third shafts.

4. A calculating machine comprising a shaft carrying a number-indicating element corresponding to varying angular positions of the shaft, a second shaft, a variable-radius element carried by the first shaft and having a periphery having varying radii which are circumferentially spaced in functions of one-ninth of the circumference and have lengths in logarithmic functions corresponding to successive radii, a coacting variable radius element carried with the second shaft and having a periphery having varying radii which are circumferentially spaced in logarithmic functions and lengths equal to a constant minus the length of a corresponding radius of the cooperating element, a third shaft, a separable connection between the second and third shafts, a fourth shaft, a number-indicating element carried by the fourth shaft, cooperating elements connecting the third and fourth shafts similar to the connections between the first and second shafts, and a separable connection between the third and fourth shafts.

5. A calculating machine comprising a number-indicating element, a setting element movable to successive positions, separable connections between the indicating element and the setting element to shift the setting element through successive distances corresponding to logarithmic functions of successive distances of movement of the number indicating element, a second number-indicating element, an indicator associated with the setting element whereby it may be positioned relative to the setting element, and connections between said indicator and the second number-indicating element to translate the logarithmic position of the setting element into a number indication on the second number-indicating element.

6. A calculating machine comprising a shaft carrying a number-indicating element indicating its angular position, a second shaft, variable-radius connecting elements between the first and the second shafts whereby movement of the first shaft will result in a movement of the second shaft proportionate to a logarithmic function of the movement of the first shaft, a separable connection between the first and second shafts whereby successive movements of the first shaft may be cumulated in the second shaft, a third shaft carrying a number-indicating element, an indicator associated with the second shaft whereby it may be positioned relative to the cumulated position of said shaft, and connections between the indicator and the third shaft whereby the cumulated position of the second shaft may be translated into a number position of the third shaft corresponding to the logarithmic position of the second shaft.

7. A calculating machine comprising a shaft carrying a number-indicating element corresponding to varying angular positions of the shaft, a second shaft, a variable-radius element carried by the first shaft and having a periphery having varying radii which are circumferentially spaced in functions of one-ninth of the circumference and have lengths in logarithmic functions corresponding to successive radii, a coacting variable radius element carried with the second shaft and having a periphery having varying radii which are circumferentially spaced in logarithmic functions and lengths equal to a constant minus the length of a corresponding radius of the cooperating element, a third shaft, a separable connection between the second and third shafts, a fourth shaft, a number-indicating element carried by the fourth shaft, cooperating elements connecting the third and fourth shafts similar to the connections between the first and second shafts, indicating means by which the fourth shaft may be positioned relative to the cumulated position of the third shaft, and connections between said indicator and the fourth shaft whereby the cumulated position of the third shaft may be translated into a number position corresponding to the logarithmic position of the third shaft.

In witness whereof I have hereunto set my hand at Newport News, Virginia, this fifth day of November, A. D. one thousand nine hundred and eighteen.

TAYLOR W. ROSS.